US008028742B2

(12) United States Patent
Fiedrich (10) Patent No.: US 8,028,742 B2
(45) Date of Patent: Oct. 4, 2011

(54) RADIANT HEATING/COOLING TUBING SUBSTRATE WITH IN PLANE BUS

(76) Inventor: Joachim Fiedrich, Carlisle, MA (US)

( * ) Notice: Subject to any disclaimer, the term of this patent is extended or adjusted under 35 U.S.C. 154(b) by 899 days.

(21) Appl. No.: 11/327,183

(22) Filed: Jan. 5, 2006

(65) Prior Publication Data

US 2006/0144578 A1 Jul. 6, 2006

Related U.S. Application Data

(60) Provisional application No. 60/641,396, filed on Jan. 5, 2005.

(51) Int. Cl.
*F24D 3/16* (2006.01)
(52) U.S. Cl. .............................. 165/56; 237/69; 165/49
(58) Field of Classification Search .................... 237/69; 165/49, 53, 56
See application file for complete search history.

(56) References Cited

U.S. PATENT DOCUMENTS

| | | | | | |
|---|---|---|---|---|---|
| 3,037,746 | A | * | 6/1962 | Williams | 165/56 |
| 3,318,056 | A | * | 5/1967 | Thompson | 52/105 |
| 4,508,162 | A | * | 4/1985 | Radtke | 165/56 |
| 5,100,221 | A | * | 3/1992 | Carney et al. | 385/135 |
| 5,119,988 | A | | 6/1992 | Fiedrich | |
| 5,292,065 | A | | 3/1994 | Fiedrich | |
| 5,579,996 | A | | 12/1996 | Fiedrich | |
| 5,788,152 | A | | 8/1998 | Alsberg | |
| 5,931,381 | A | | 8/1999 | Fiedrich | |
| 6,092,587 | A | * | 7/2000 | Ingram | 165/56 |
| 6,182,903 | B1 | | 2/2001 | Fiedrich | |
| 6,205,729 | B1 | * | 3/2001 | Porter | 52/309.7 |
| 6,220,523 | B1 | | 4/2001 | Fiedrich | |
| 6,283,382 | B1 | * | 9/2001 | Fitzemeyer | 237/69 |
| 6,553,172 | B2 | * | 4/2003 | Lortie et al. | 385/134 |
| 6,621,983 | B2 | * | 9/2003 | Thorin | 392/435 |
| 6,776,222 | B2 | * | 8/2004 | Seki et al. | 165/56 |
| 6,883,590 | B1 | * | 4/2005 | Messana | 165/56 |
| 6,901,713 | B2 | * | 6/2005 | Axsom | 52/481.1 |
| 7,021,372 | B2 | * | 4/2006 | Pickard | 165/168 |
| 2004/0026525 | A1 | | 2/2004 | Fiedrich | |

FOREIGN PATENT DOCUMENTS

| | | | | |
|---|---|---|---|---|
| DE | 3208278 | A1 | * | 9/1983 |
| JP | 09222231 | A | * | 8/1997 |
| JP | 10219925 | A | * | 8/1998 |

* cited by examiner

*Primary Examiner* — Jeanette E Chapman
*Assistant Examiner* — Daniel Kenny
(74) *Attorney, Agent, or Firm* — Houston Eliseeva, LLP (57) ABSTRACT

Modular panels for radiant thermal conditioning systems have special purpose bus tracks for routing tubing. Specifically, these tracks enable the routing of tubing, and specifically tubing from multiple circuits, in-plane, in the floor, ceiling, or walls. Specifically, multiple laterally extending tracks are provided for handling multiple circuits. A modular panel enables the interconnection between tubing held in bus tracks and the arcuate return tracks that are used for the tubing direction changes that are needed for creating serpentine paths of the tubing loops.

7 Claims, 7 Drawing Sheets

RADIANT HEATING/COOLING TUBING SUBSTRATE WITH IN PLANE BUS

RELATED APPLICATIONS

This application claims the benefit under 35 USC 119(e) of U.S. Provisional Application No. 60/641,396, filed Jan. 5, 2005, which is incorporated herein by reference in its entirety.

BACKGROUND OF THE INVENTION

Hydronic radiant floor, wall, and ceiling heating are techniques for heating a space, such as a room in a dwelling or commercial building, usually for human and creature comfort. Typical hydronic heating systems require a supply of hot water or other fluid from a boiler, for example, and valves for controlling the quantity of the water from the supply that is fed to the heating loops, which include tubing and/or heating elements. It is often necessary to control the temperature of the water in the heating loops. For example, if the supply water temperature is about 180° F. (80° C.) for laundry, it must be modulated down to about 100° F. or 40° C. (or lower) for radiant systems.

A suitable system for reducing and controlling the supply water temperature is described in U.S. Pat. No. 5,119,988, issued Jun. 9, 1992, entitled "Hydronic Heating Water Temperature Control System", to Joachim Fiedrich, the inventor herein. In that patent, a three-way, modulated diverting or by-pass valve is provided, in the return line to the boiler, for diverting some of the cooler return water to the hot supply water to reduce the temperature of the supply water feeding the heating loop supply header. This is sometimes called temperature dilution and the diverting valve is modulated by a feedback signal derived from the diluted water temperature.

A number of approaches are available for distributing the tubing in the space to be heated to form the heating loops. In one such approach, the tubing is set in the concrete flooring. In other cases, the heat loop tubing is installed between the floor or ceiling joists using metal radiation plates.

A preferable approach for forming the heating loops relies on modular panel heating elements. Some examples are described in U.S. Pat. No. 5,292,065, issued Mar. 8, 1994, entitled "Radiant Floor and Wall Hydronic Heating Systems", to Joachim Fiedrich, the inventor herein. The panel elements include integral metal radiation plates or sheets that are attached to two spaced apart boards, which cooperate to hold the tubing in intimate thermal contact with the radiation plate, so that the plate is heated by conduction of heat from the tubing. The plate then provides a surface that radiates heat into the room. Thermal conduction from the tubing to the plate and mechanical attachment of the tubing to the panel can also be ensured by using a resilient, thermally-conductive filler material as described in U.S. Pat. No. 5,579,996, issued Dec. 3, 1996, entitled "Radiant Floor and Wall Hydronic. Heating Systems", also to Joachim Fiedrich, the inventor herein.

These hydronic radiant systems can also be used for cooling. The cooling is accomplished by feeding cool water or fluid to the tubing to reduce the temperature of the radiation plate in the modular panel, to below room temperature. As a result, heat is radiated from the room to the metal plate and conducted from the plate to the cool water in the tubing. This heats the water slightly, and the water is then fed to a heat exchanger, for example, where it gives up the heat and is fed back to the panels.

More recently, the instant inventor described a system of installing the tubing in sheets of gypsum or cement wallboard as described in U.S. Pat. Appl. Publ. No. 2004/0026525 A1, entitled "In radiant wall and ceiling hydronic room heating or cooling systems, using tubing that is fed hot or cold water, the tubing is embedded in gypsum or cement wallboard in intimate thermal contact therewith so that the wallboard heats or cools the room", which is incorporated herein in its entity by this reference.

Often, these modular panel systems use a number of different types of panels to create the continuous tracks required to hold the tubing of the radiant loops. Most commonly, straight, lateral run track panels are connected end-to-end to provide tubing tracks that extend laterally across the room or space to be heated or cooled. At the end of the tracks on each of these lateral run panels, "U" turn or return track panels are usually used. These return track panels comprise arcuate tracks that allow the tubing to be routed between successive tracks in the lateral run track panels by laying the tubing through the 180 degree arc of the return track. Using the combination of the straight tracks of the lateral run track panels and the return tracks of the return track panels, large serpentine radiant tubing loops can be created in the floors, walls and/or ceilings of rooms or other spaces.

In order to complete the radiant heating/cooling loops, connections must be further made between the tubing loops and the manifold, circulating pump, and/or injection valve control assemblies that are located, for example, in a closet or other area near or in the room or space to be heated or cooled. This routing between the typically serpentine layout of the tubing in the floor, for example, and the manifold, pump, and injection valves of the control assemblies can be performed either in-plane and/or out-of-plane.

In in-plane routing, the connections is routed, at least in part, in the plane of the floor, wall, or ceiling. Often, the long runs to the control assembly can be made in tracks constructed from the lateral run track panels. This has advantages since the tubing routed in this connection can also contribute to the heating and/or cooling of the space.

Routing between the serpentine tubing layout on the floor, wall, or ceiling and the control assembly can also be performed out-of-plane. In this case, a hole is usually drilled through the floor, for example, and then the tubing is routed between or through the floor joints to connect the serpentine layout with the control assembly. In the case of a wall, the tubing is routed through the wall studs. And in the case of a ceiling, the tubing is routed through or between the ceiling joists.

SUMMARY OF THE INVENTION

Problems, however, can occur with in-plane routing between the radiant tubing loops and the control assemblies. Often special tracks or recesses must be fabricated in the sub-flooring. This is a time consuming process that is typically performed on-site using a router, which is used to mill the recesses in the subfloor that will hold the tubing. The task becomes even more problematic when a single control assembly is used for multiple circuits since two or more pairs of tubes must be routed across the subfloor, for example, to the possibly distributed circuits.

This complex in-plane routing is required in some applications, especially when retrofitting tubing in existing structures or when installing tubing loops in basements, for example, where out-of-plane routing is not feasible. Out-of-plane routing is difficult when the tubing is not easily routed through the floor, for example, because the ceiling of the room below may be finished, requiring at least partial removal of the wallboard or other ceiling facing in the lower room in order to string the tubing between the radiant tubing loop and the control assembly. A similar problem arises when installing radiant systems in basements. Here, it is often not feasible to route the tubing underneath the basement floor. As a result, all the routing needs to be made through the walls or in in-plane milled tracks in the sub-flooring or the basement floor slab.

The present invention is directed to modular panels for radiant thermal conditioning systems. These panels are provided with special purpose bus tracks for routing tubing. Specifically, these tracks enable the routing of tubing, and specifically tubing from multiple circuits, in-plane, in the floor, ceiling, or walls. Specifically, multiple laterally extending tracks are provided for handling multiple circuits.

The invention is also directed to a modular panel that enables the interconnection between tubing held in bus tracks and the arcuate return tracks that are used for the tubing direction changes, which are needed for creating serpentine paths of the tubing loops.

In general, according to one aspect, the invention features a modular panel for a radiant thermal conditioning system. This panel comprises tracks for tubing of the radiant system. Specifically, four or more laterally extending tracks are disposed in the panel. These tracks are typically provided within a width of less than about four feet or 1.2 meters. In this way, the tracks are densely packed next to each other in a direction that is transverse to the direction that the tracks extend.

Specifically, in a preferred embodiment, four or more laterally extending tracks are provided in a width of less than one foot or 0.3 meters to thereby allow for high density packing of tubing being routed to the space to be heated or cooled. This high density packing distinguishes the invention from conventional lateral run panels that have multiple widely-spaced linear tracks.

In one embodiment, these modular panels function as sub-flooring. In this case, they are typically manufactured from wood material, such as plywood, fiber board, or other wood composite. Although in other examples, they are manufactured from concrete board as is commonly used, for example, under tiling or stone floors in bathrooms or entryways.

In other embodiments, the modular panels are fabricated from gypsum or concrete wallboard. In these cases, the modular panels typically function as ceiling or wall panels.

In general, according to another aspect, the invention features a modular panel for a radiant thermal conditioning system. This panel comprises tracks for tubing of the radiant system. The tracks comprise at least one arcuate return track for routing tubing to change a direction of the routing of the tubing such as by substantially 180°, for example. These are also called return or u-turn tracks.

Further, at least one laterally extending bus track is also provided for routing tubing along a length of the panel.

In a preferred embodiment, at least one crossover track is provided for routing tubing between the return track and the bus track.

In generally according to another aspect, the invention relates to routing inserts that provide arcuate paths for routing tubing between multiple bus tracks and a track of a lateral run panel that is perpendicular to the multiple bus tracks.

In generally according to another aspect, the invention relates to routing inserts that provide arcuate paths for routing tubing of multiple bus tracks through 90 degree turns. In one embodiment, the 4 or more arcuate bus tracks are nested next to each other through the 90 degree turn.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
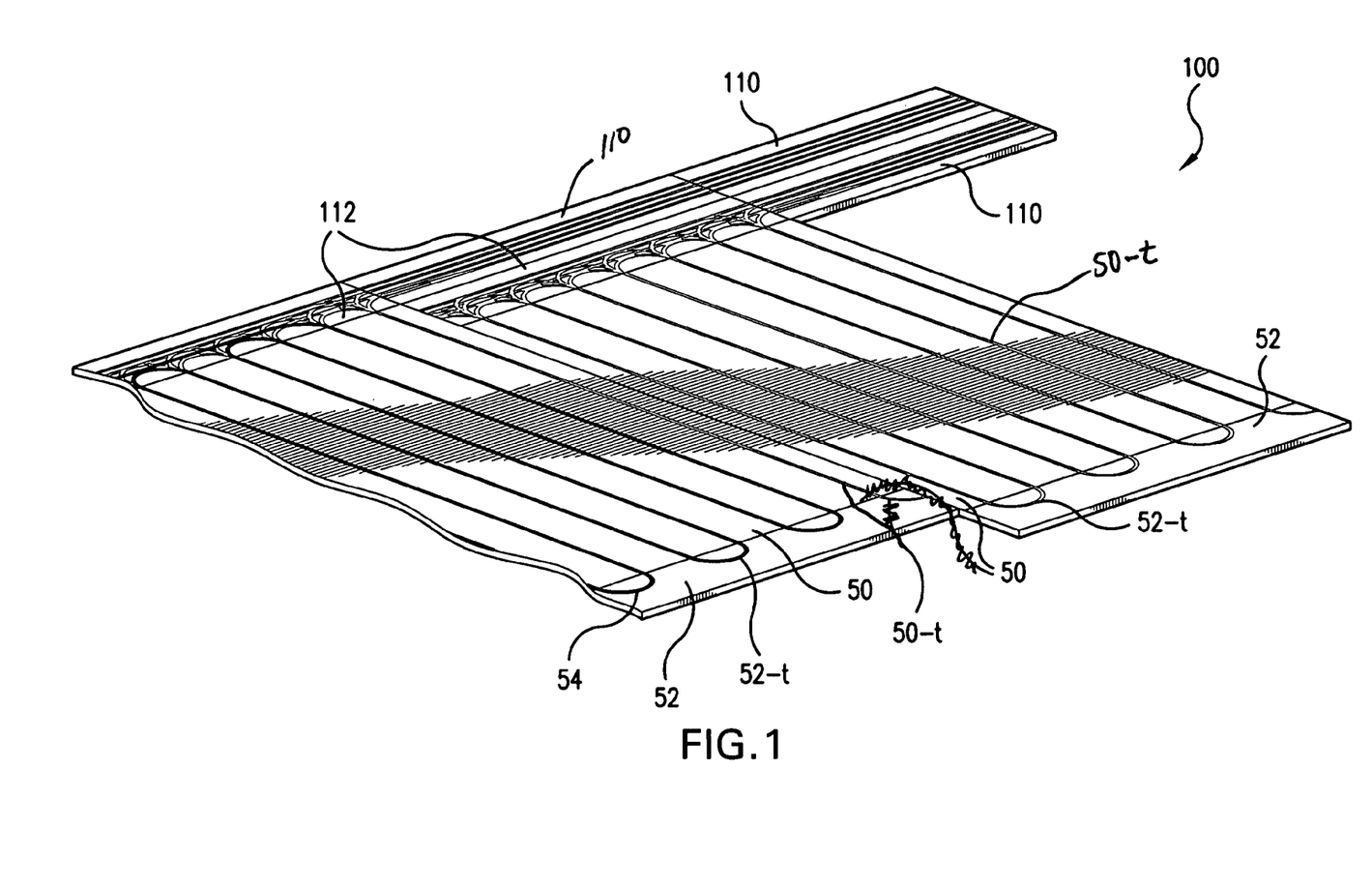
FIG. 1 is a perspective view showing serpentine tracks provided in a modular subflooring panel system, illustrating how the radiant tubing is installed in a floor, for example, and also shows the bus track panels and return/bus track panels according to the present invention.

FIG. 1 shows, in a radiant thermal conditioning system, a modular panel system 100, which has been constructed according to the principles of the present invention.

Specifically, a series of lateral run panels 50 are laid out to form straight tracks 50-t of a continuous serpentine track in to which tubing 54 is installed to create the radiant loop. In one embodiment, these lateral run panels 50 are constructed as described in U.S. Pat. No. 6,182,903 to Joachim Friedrich entitled, "Radiant Floor, Wall and Ceiling Hydronic Heating and/or Cooling Systems Using Modular Panels Hinged Together in Sets of Panels Staggering the Position of Panels in Sets so that Sets are Interlocking," which is incorporated herein in its entirety by this reference.

Also shown are conventional return panels 52 that are positioned at the lateral ends of the lateral run panels 50. These return panels 52 provide u-turn or return tracks 52-t that interface with the straight tracks 50-t of the lateral run panels 50 to thereby complete the serpentine track for the radiant loop in the sub-floor.

Further shown are the inventive bus panel 110 and a first embodiment of a return/bus panel 112 of the present invention.

Figure 2:
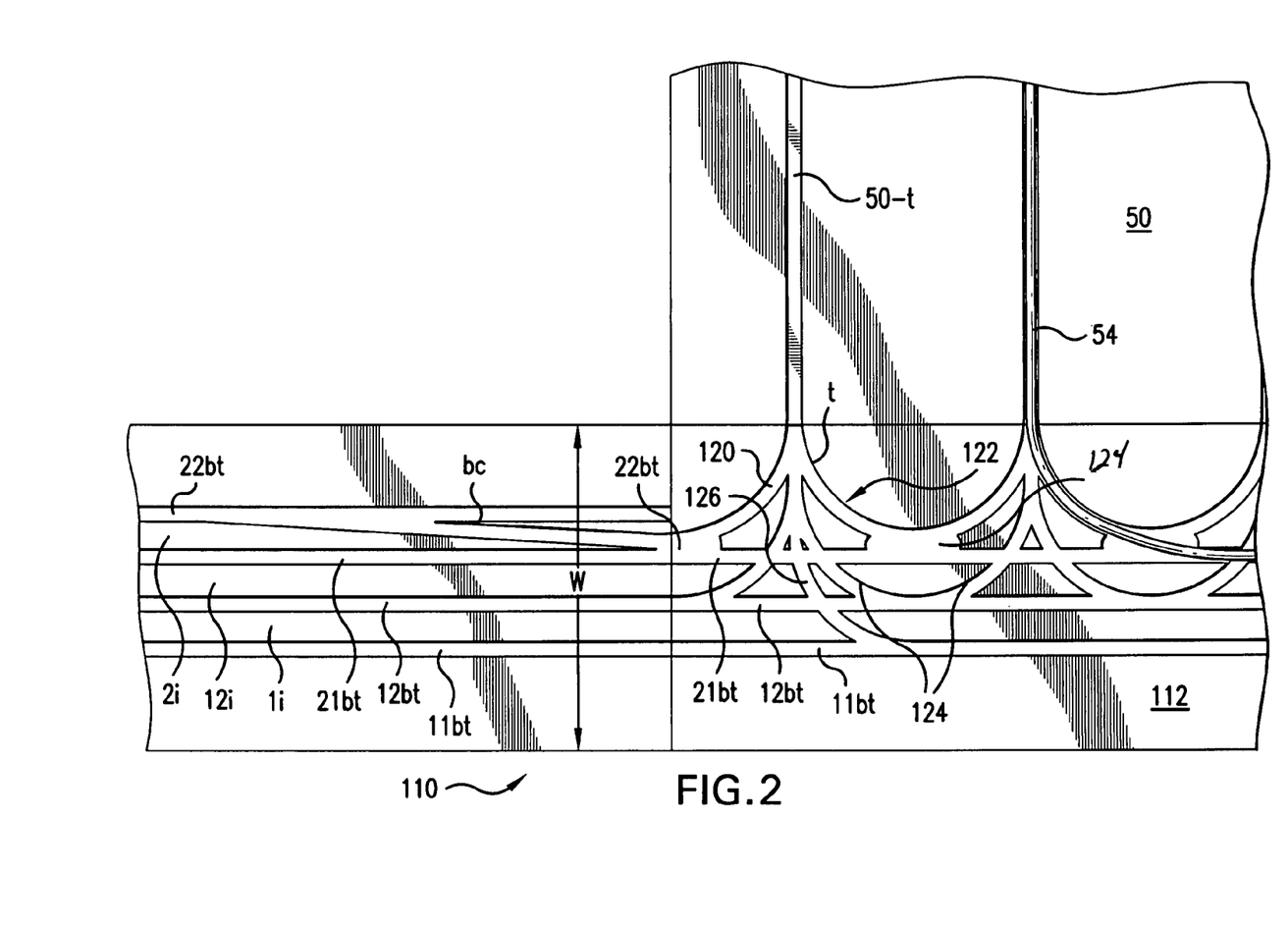
FIG. 2 is a close-up view showing a bus panel interfacing with a return/bus panel, according to the present invention.

FIG. 2 is a close-up view showing the bus panel interfacing 110 with the return/bus panel 112 of the first embodiment of the present invention.

Specifically, the bus panel 110 comprises a loop-1, track-1 bus 11*bt*, a loop-1, track-2 bus 12*bt*, a loop-2, track-1 bus 21*bt*, and a loop-2, track-2 bus 22*bt*. Each of these bus tracks 11*bt*, 12*bt*, 21*bt*, 22*bt* extends along the entire length of the bus panel 110 in the preferred embodiment. Further, each of the bus tracks 11*bt*, 12*bt*, 21*bt*, 22*bt* extends parallel to each other. Further, islands: loop-1 island 1*i*, loop-12 island 12*i*, and loop-2 island 2*i*, are preferably provided separating each of the loop-1, track-1 bus 11*bt*, loop-1, track-2 bus 12*bt*, loop-2, track-1 bus 21*bt*, and a loop-2, track-2 bus 22*bt* from each other. Thus, the tubing 54 can be press fit into these separated tracks 11*bt*, 12*bt*, 21*bt*, 22*bt* during the installation process.

The tracks are sized to accommodate tubing for installation in the floor. Generally the tubing 54 has an outside diameter of between 0.25 and 0.75 inches, usually around 0.5 inches.

According to an aspect of the invention, the multiple tracks 11*bt*, 12*bt*, 21*bt*, 22*bt* of the bus panel 110 are provided within a narrow width W of the bus panel. In the illustrated embodiment, two or more pairs of tracks are provided in order to accommodate the connection and routing of tubing to support two or more radiant loops. Preferably, the width W is less than about 4 feet or 1.2 meters such as a lateral run panel 50. In this way, four or more relatively closely spaced tracks are provided within a small distance. In the illustrated embodiment, at least 3 and preferably 4 or more laterally extending tracks 11*bt*, 12*bt*, 21*bt*, 22*bt* are disposed within a width W of less than 1 foot or 0.3 meters, or less, preferably within a width of panel 110 that is about 9 inches or 230 millimeters wide. This tight, dense track spacing is important when running tubing connections between the control assembly and the tubing loops of a room when relying on in-plane routing.

When a bus panel 110 is engaged and interfacing with a return/bus panel 112, each of the loop-1, track-1 bus 11*bt*, loop-1, track-2 bus 12*bt*, a loop-2, track-1 bus 21*bt*, and a loop-2, track-2 bus 22*bt* interface with similar tracks in the return/bus panel 112, to thereby form continuous tracks with a corresponding loop-1, track-1 bus 11*bt*, loop-1, track-2 bus 12*bt*, a loop-2, track-1 bus 21*bt*, and a loop-2, track-2 bus 22*bt* of the return/bus panel 112. Thus, tubing laid out in the loop-1, track-1 bus 11*bt*, for example, can bridge continuously between the bus panel 110 and the return bus panel 112.

The loop-2, track-2 bus 22*bt*, in one embodiment, interfaces with a bus crossover bc. This allows the loop-2, track-2 bus 22*bt* to interface or interconnect with the loop-2, track-1 bus 21*bt* of the return/bus panel 112 when the bus panel 110 is mated with the return/bus panel 112. As a result, tubing laid out in the loop-2, track-2 bus 22*bt* and then extending along the bus crossover bc can then be routed into the track 50-*t* of the lateral run panel 50 via a lateral run crossover 120. This is an arcuate track that connects the loop-2, track-1 bus 21*bt* and the loop-2, track-2 bus 22*bt* of an adjacent bus panel 110 to the lateral run 50-*t* of the lateral run panels 50.

Also provided in the return/bus panel 112 are u-turn or return tracks 122. These allow tubing that is laid in the tracks 50-*t* of the lateral run panels 50 to form a u-turn and thus continue its serpentine path in the next track 50-*t* of the lateral run panels 50.

Also provided are return crossovers 124 that enable routing between the return and the loop-2, track 1 21*bt* and loop-1, track-2 bus 12*bt*.

Finally, second return track crossovers 126 are further provided that allow for routing between the return 50-*t* and the loop-1, track-1 bus 11*bt* of the return bus/track panel 112.

In the preferred embodiment, the lateral run crossovers 120 and the return crossovers 124 extend in either direction so that tubing can be routed either into and/or out of each of the tracks 50-*t* of the lateral run panels 50, or from either direction.

Further, the second return crossovers 126 can also be routed in either direction in one embodiment. However, in the illustrated embodiment, the second return crossovers 126 allow routing only in one direction, that is, toward the center of the return/bus panel 112.

Figure 3:
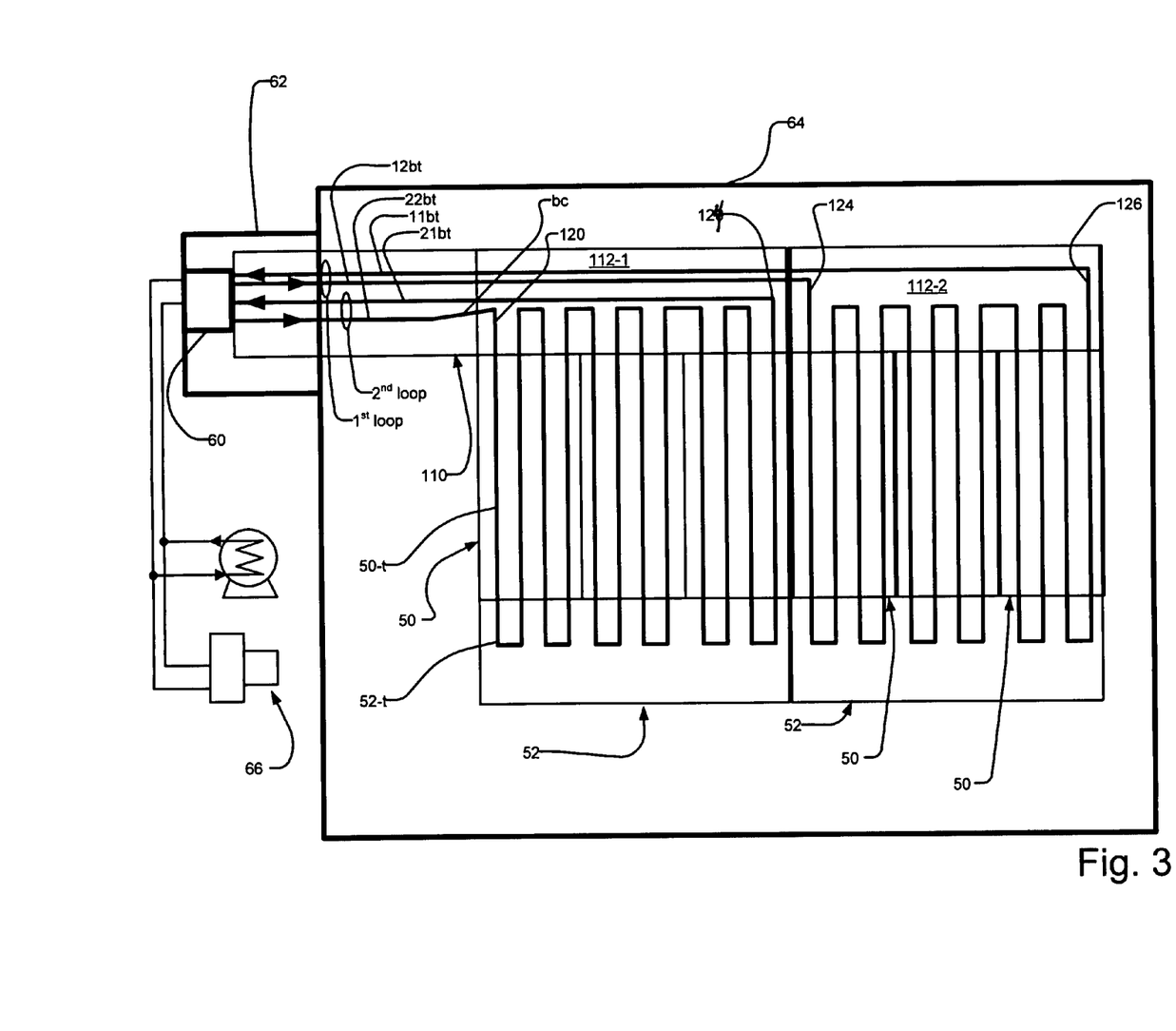
FIG. 3 is a schematic plan view showing the routing of the radiant tubing between the serpentine radiant tubing loop and the manifolds, circulating pumps, and injection valves of the control assembly, according to one embodiment.

FIG. 3 is a schematic diagram illustrating the use of the bus panel 110 and the return/bus panel 112 to enable the in-plane routing of the radiant tubing. Specifically, a manifold, circulating pump, and injection valve control assembly 60 is located, for example, within a closet 62 adjacent to a room 64 in which thermal conditioning is required. The control assembly 60 receives heated or cooled water via a heating/cooling circuit that is connected to for example, a boiler heating unit and/or condenser cooling unit 66.

In the illustrated embodiment, the manifold/control assembly 60 supports two separate circuits for heating the room. Specifically, the corresponding tubing for the two circuits is laid out in a bus panel 110 in each of the four tracks. In the illustrated example, a first circuit or loop is laid out in the loop-1 tracks 11*bt*, 12*bt*, whereas a second loop is laid out in a bus tracks 21*bt*, 22*bt*.

The tubing of the second circuit extends in the loop-2, track-1 and loop-2, track-2 bus tracks 21*bt*, 22*bt* of the bus panel 110. The tubing is then routed to the bus crossover bc. This allows the tubing to then, via the lateral run crossover 120 of first return/bus panel 112-1, to enter the serpentine loop formed from the straight tracks 50-*t* of the lateral run panels 50 and return tracks 52-*t* of the return panels 52.

At the end of the circuit, the tubing is routed via the lateral run crossover 124 to the loop-2, track-1 bus 21*bt* of the return/bus panel 112-1 thereby completing the second circuit.

Tubing of the first circuit is laid out in the loop-1, track-1 and loop-1, track-2 11*bt*, 12*bt* bus tracks. In the illustrated embodiment, it extends completely across the first return/bus panel 112-1 to form a circuit supported by a second return/bus panel 112-2 that interfaces with the first return/bus panel 112-1.

Specifically, the tubing in the loop-1, track-2 is routed via the first return crossovers 124 to the serpentine path provided by the lateral run panels 50 and return panels 52 of the first circuit. Here, in the first circuit, the serpentine path of the tubing extends in a second return crossover 126 so that the return path is provided in the loop-1, track-1 of the first and second return/bus panels 112-1, 11-2 and the bus panel 110, back to the closet.

Generally, only if more than two circuits are used, typically rooms over 300 square feet, is the bus panel 110 required since the return bus panel 112 can accommodate up to two circuits on its own. The return bus panels 112 enable the tubing to exit on either side while providing proper serpentine paths for the tubing at the same time. This universal usage of the return panel 112 to route the tubing back to the manifold is crucial to eliminate on site milling and improvisation.

Figure 4:
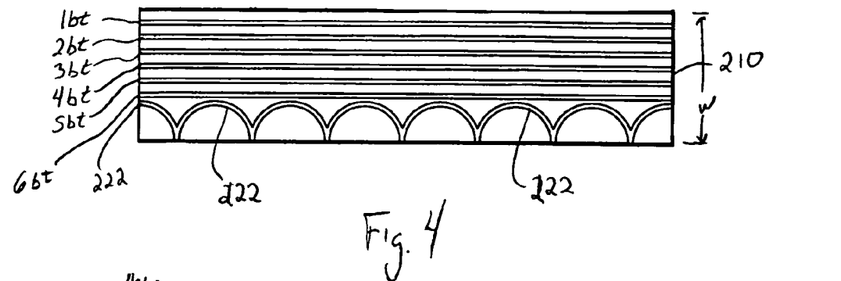
FIG. 4 is a plan view showing a return/bus panel according to a second embodiment of the present invention.

FIG. 4 shows a return/bus panel 210 according to a second embodiment. It comprises a series of U-turn or return tracks 222. These are tracks that allow the direction of the tubing to be changed 180 degrees. Typically, these return tracks 122 interface with tracks 50-*t* on lateral run panels 50.

The second embodiment return/bus panel also comprises a series of track buses 1*bt*, 2*bt*, 3*bt*, 4*bt*, 5*bt*, 6*bt*. These extend the length of the return/bus panel 210. Generally, the spacing of these bus tracks 1*bt*-6*bt* is close. Specifically, the width W is less than about 4 feet or 1.2 meters. In this way, four or more relatively closely spaced tracks are provided within a small distance. In the illustrated embodiment, at least 4 and preferably 5 or 6 or more laterally extending tracks $1bt$, $2bt$, $3bt$, $4bt$, $5bt$, $6bt$ are disposed within a width W of less than 1 foot or 0.3 meters, or less, preferably within a width of panel 110 that is about 9.25 inches or 235 millimeters wide. Including any tubing routed in the return tracks 222, a total of three loops can be supported in this second embodiment return/bus panel 210.

Figure 5:
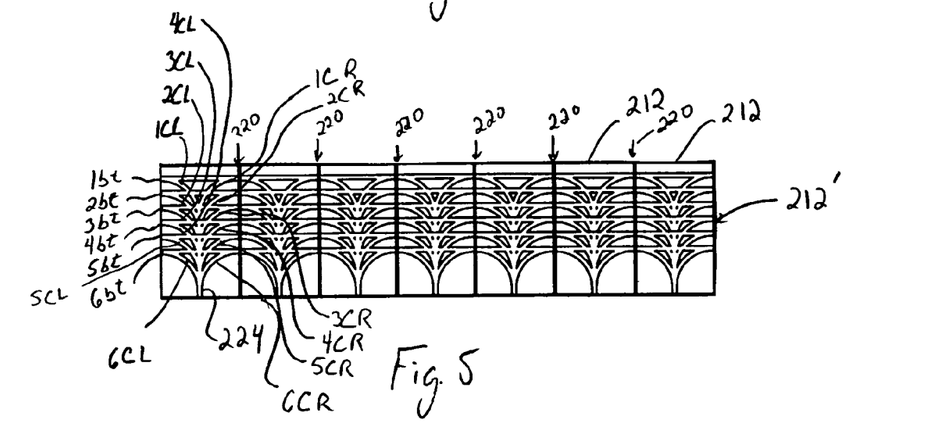
FIG. 5 is a plan view showing a panel comprising a series of routing inserts according to the invention.

FIG. 5 illustrates a routing insert panel 212' that comprises a series of routing inserts 212. The panel 212' is cut, using for example, a chop saw/circular saw along lines 220. This dices the panel 212' into a series of routing inserts 212. Typically, the routing inserts are sold separately although the panel 212' can be sold as a unitary piece, then cut at the job site.

Each of the routing inserts 212 comprises tracks that would interface with a corresponding one of the bus tracks in the second embodiment return/bus panel 210, for example. Specifically, bus tracks $1bt$, $2bt$, $3bt$, $4bt$, $5bt$ and $6bt$ extend longitudinally across the entire length of each of the routing inserts 212. Also provided, are arcuate tracks that connect each of the bus tracks $1bt$ to $6bt$ to a laterally extending track 224 that would interface directly with the tracks $50\text{-}t$ of a lateral run panel 50. Specifically, in the illustrated embodiment, these arcuate tracks extend in both directions, that is, both to the right and to the left of the lateral run track 224. Specifically, there are six left crossovers $1cl$ to $6cl$ that connect the lateral track 224 to each of the bus tracks $1bt\text{-}6bt$. Similarly, there are a series of right crossovers $1cr$ to $6cr$ that connect the lateral run track 224 to each of the bus tracks in the direction to the right. In this way, using one of these routing inserts 220, tubing can be routed between any one of the bus tracks $1bt$ to $6bt$ and the lateral run track 224 and in either direction.

Figure 6:
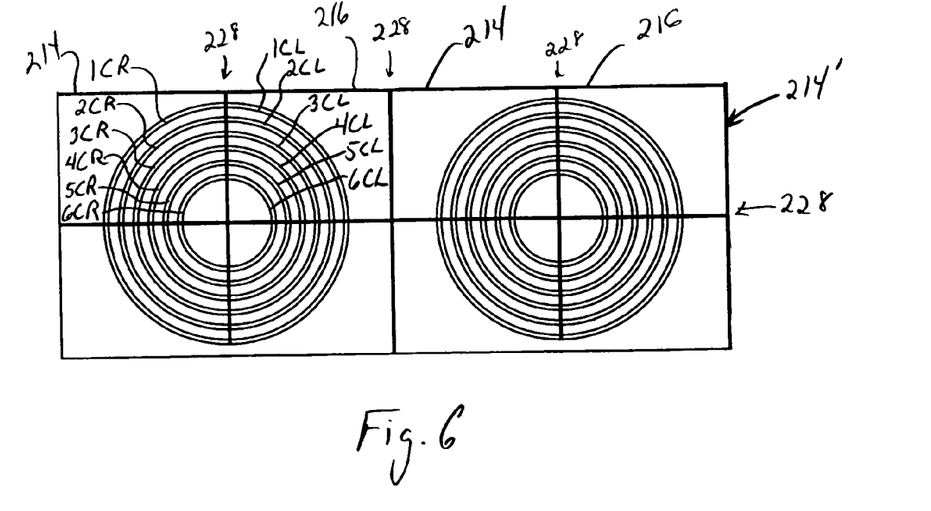
FIG. 6 is a plan view showing a panel comprising a series of routing inserts according to a second embodiment.

FIG. 6 shows a panel 214 of routing inserts 214, 216 according to another embodiment. Simply, the panel 214' is divided up into the separate routing inserts 214, 216 by cutting the panel 214' along each of the lines 228 that extend both longitudinally and laterally. Each of the second embodiment routing inserts 214, 216 comprises nested right turn tracks or left turn tracks. Specifically, panel 214 comprises six right turn tracks $1cr$, $2cr$, $3cr$, $4cr$, $5cr$, $6cr$. Routing insert 216 comprises six corresponding left turn tracks $1cl$, $2cl$, $3cl$, $4cl$, $5cl$, and $6cl$. Aligning the ends of one of these right or left crossover tracks $1cr\text{-}6cr$, $1cl\text{-}6cl$ with a lateral run track, 3 loop of tubing can be redirected in-plane by 90 degrees to route the array of tubes around corners for example.

Figure 7:
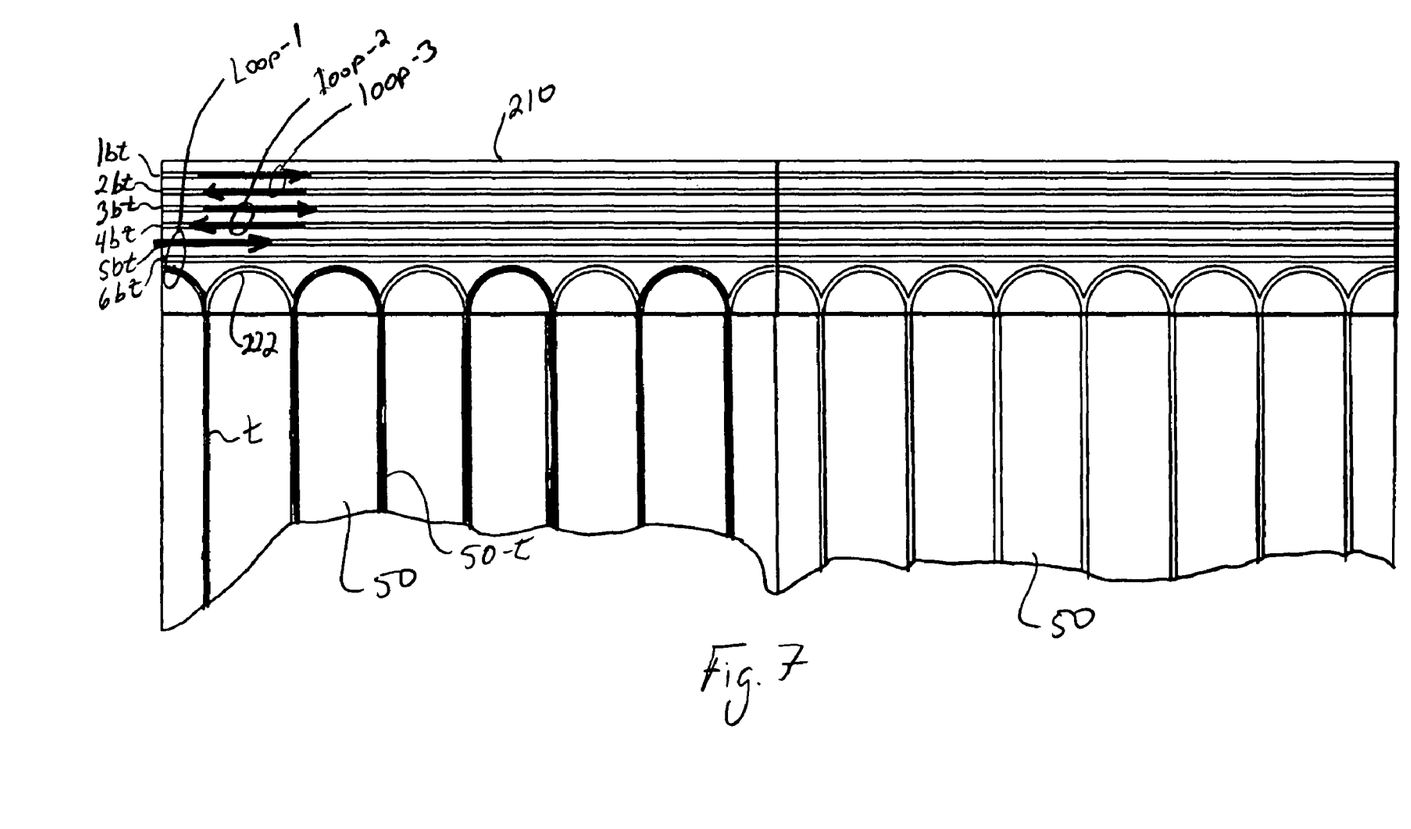
FIG. 7 is a schematic plan view illustrating the use of the return/bus panel of the second embodiment in a modular subflooring panel system.

FIG. 7 illustrates the second embodiment return/bus panel 210 installed at the ends of a series of lateral run bus panels 50. The lateral run tracks $50\text{-}t$ of the bus panels then interface with the return tracks 222 of the panel 210. This allows the tubing t to be routed through the lateral run tracks $50\text{-}t$ and through the arcuate paths of the return tracks 222 of the return/bus panel 210. Also, the other bus tracks $1bt\text{-}6bt$ can be used to support the other end of the loop in the bus tracks 50 in addition to two other loops, loop-2 and loop-3. This allows the other loops, loop-2 and loop-3 to be routed to other areas of the modular subflooring panel system to provide water or fluid to those areas.

Figure 8:
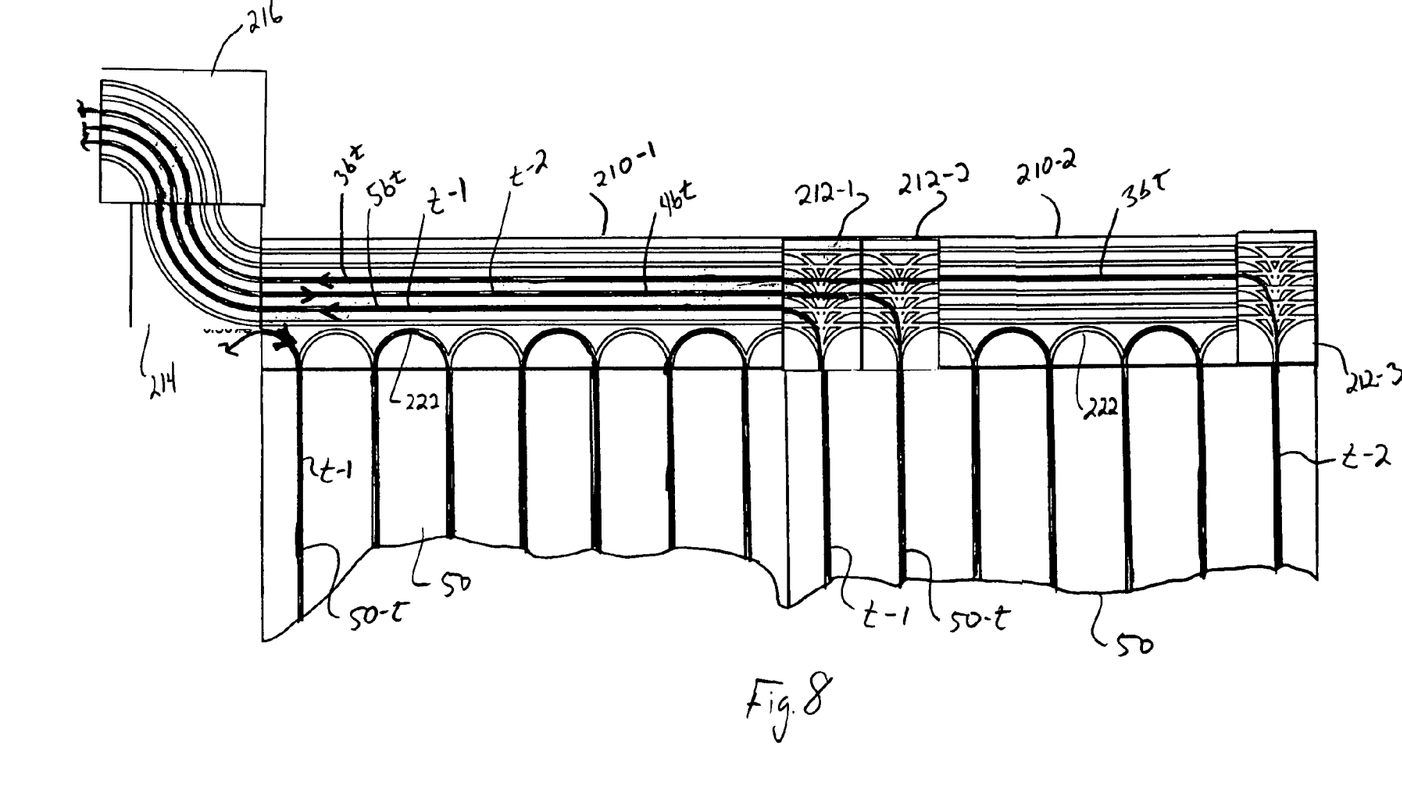
FIG. 8 is a plan view of a modular subfloor panel system comprising the second embodiment return/bus panel and the routing inserts according to the first and second embodiments.

FIG. 8 illustrates the use of the first and second embodiment routing inserts 212, 214, 216. Specifically, a first second embodiment return/bus panel 210-1 is used to route tubing for a second loop and also provide a serpentine path in the lateral run floor panels 50. Specifically, tube t-1 extends through the tracks $50\text{-}t$ of the lateral run bus panels 50 and the arcuate paths of the return tracks 222.

At the end of the circuit, the tube returns on bus $5bt$ via routing insert 212-1. This allows the tube t-1 to complete its circuit. A second tube t-2 is routed in on bus track $4bt$. It enters the lateral run tracks $50\text{-}t$ of the lateral run floor panels 50 via the second routing insert 212-2. It similarly extends through the lateral run tracks $50\text{-}t$ and the return tracks 222 of the return/bus panel 210-2. It then exits the lateral run panels via the routing insert 212-3 to be routed on to bus $3bt$ of the lateral run panels 212 to thereby complete the circuit.

The second embodiment routing inserts 214, 216 are shown interfacing with the return/bus panel 210-1. Then enable the tubes to be routed through 90 degree turns with due to there 6 or more nested arcuate tracks.

Figure 9:
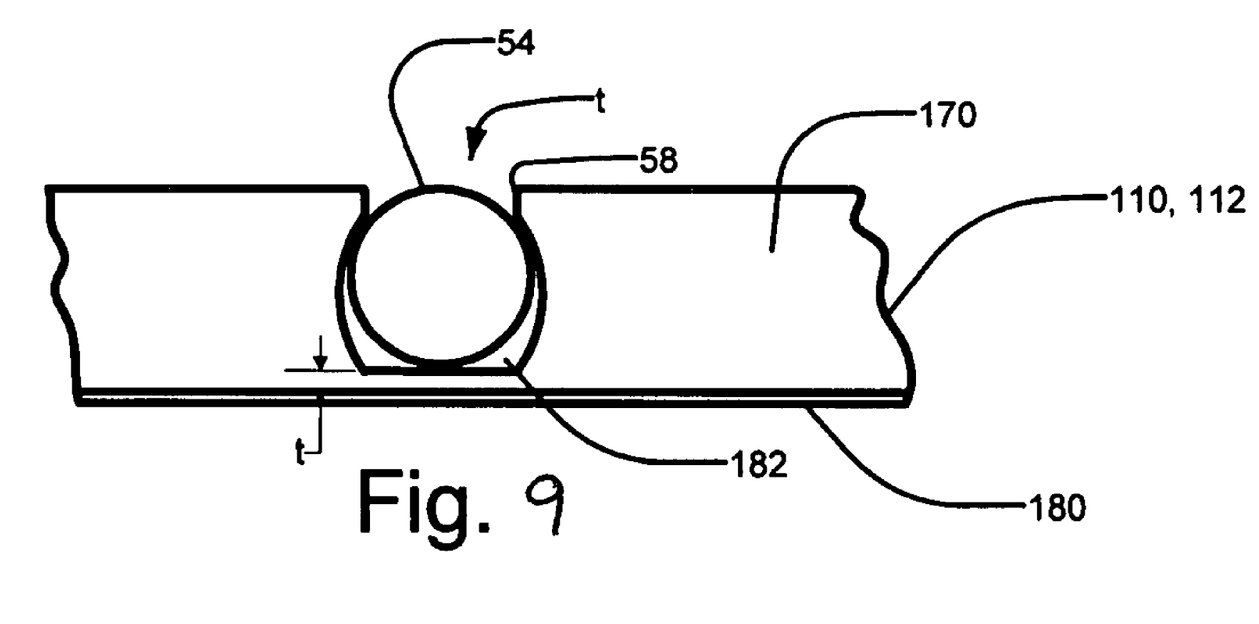
FIG. 9 is a cross-sectional view showing a track in a modular panel according to the present invention.

FIG. 9 is a cross-sectional view illustrating one embodiment of the tracks in the modular panels 110, 112, 210, and inserts 212, 214, 216 according to the present invention.

Specifically, the tracks are formed in a bulk material or substrate 170 of the panel 110, 112 210, and inserts 212, 214, 216. In one embodiment, this is plywood or other wood fiber board, especially when the paneling is used as part of sub-flooring. In other examples, the bulk material is, for example, concrete or gypsum when used in walls or ceilings or as sub-flooring under tiles or stone floors, as, for example, in bathrooms and entryways.

In other embodiments, the bulk material 170 of the panels is manufactured from a plastic, for example, a thermoplastic, or a plastic wood composite. In these examples, it is manufactured using injection molding or a blow molding technique. This approach enables the disclosed embodiments to better withstand the thin cross-sectioning provided by the introduction of so many tracks as in the routing inserts 212, 214, 216. Further, it can impact cost of production since if wood products are used, each of the tracks must be separately milled typically using a router or other milling device.

The track t comprises a substantially a bull-nose cutout. This allows the tubing 54 of between 0.25 and 0.75 inches in diameter to be press-fit/snap-fit into the track t and then held there by the constricted mouth 58 of the track.

In the preferred embodiment, the tracks t do not extend all the way through the panel vertically. Instead, there is a small remaining thickness t to provide for the structural integrity of the panels.

In the other hand, there is a desire to always keep these panels as thin as possible, while maximizing the diameter of the tubing 54 to increase capacity. Thus, for example it is often required that this remaining thickness t be small. As a result, in some embodiments, a back binding material 180 is applied to the backside of the panel 110, 112 in order to improve the rigidity and structural integrity of the panel. In one embodiment, this is a paper backing on ½ inch plywood of the panel 110, 112, for example. In other embodiments, instead of paper, an aluminum binding is used. One advantage of using a metal, such as aluminum, is that it will improve the radiant efficiency of the system.

In some implementations, a filler and/or bonding agent such as silicone is applied into the track t before insertion of the tubing 54. This filler bonding agent fills in the space 182 to improve thermal contact and secure the tubing 54 in place.

While this invention has been particularly shown and described with references to preferred embodiments thereof, it will be understood by those skilled in the art that various changes in form and details may be made therein without departing from the scope of the invention encompassed by the appended claims.

What is claimed is:

1. A routing insert for a modular panel radiant thermal conditioning system, the routing insert comprising:

at least three bus tracks extending across the insert, each of said at least three bus tracks separated by a divider section;

a lateral track extending perpendicular to the bus tracks for interfacing with a track of a lateral run panel;

a plurality of arcuate tracks connecting the at least three bus tracks with the lateral track, and multiple track configurations based on selection of predetermined combinations of said bus tracks, lateral tracks and arcuate tracks;

wherein each of the bus tracks, the lateral track and the arcuate tracks is recessed into the routing insert to facilitate acceptance of a single tubing in each said track for radiant thermal heating and cooling via the thermal conditioning system.

2. A routing insert as claimed in claim 1, wherein the arcuate tracks enable routing to right and left directions in the bus tracks.

3. A routing insert as claimed in claim 1, further comprising a back binder applied to a back side of the routing insert.

4. A routing insert as claimed in claim 1, wherein routing insert is constructed of plastic.

5. A routing insert as claimed in claim 1, wherein routing insert is constructed of plastic and wood composite.

6. A routing insert as claimed in claim 1, further comprising said single tubing for conveying a heating or cooling fluid installed in selected tracks.

7. A routing insert as claimed in claim 1, further comprising four bus tracks extending across the insert and four pairs of arcuate tracks enabling routing to right and left directions for each of the bus tracks.

* * * * *